US011270106B2

(12) United States Patent
Szatkowski

(10) Patent No.: US 11,270,106 B2
(45) Date of Patent: Mar. 8, 2022

(54) SYSTEM AND METHOD FOR CORRECTING DOCUMENTS

(71) Applicant: W-9 Corrections, LLC, Rock Hill, SC (US)

(72) Inventor: Gerard Szatkowski, Fort Mill, SC (US)

( * ) Notice: Subject to any disclaimer, the term of this patent is extended or adjusted under 35 U.S.C. 154(b) by 218 days.

(21) Appl. No.: 16/774,876

(22) Filed: Jan. 28, 2020

(65) Prior Publication Data

US 2020/0311415 A1    Oct. 1, 2020

Related U.S. Application Data

(60) Provisional application No. 62/798,242, filed on Jan. 29, 2019.

(51) Int. Cl.
*G06K 9/00* (2006.01)
*G06F 16/9532* (2019.01)
*G06Q 40/00* (2012.01)

(52) U.S. Cl.
CPC ..... *G06K 9/00483* (2013.01); *G06F 16/9532* (2019.01); *G06K 9/00449* (2013.01); *G06K 9/00469* (2013.01); *G06Q 40/123* (2013.12)

(58) Field of Classification Search
None
See application file for complete search history.

(56) References Cited

U.S. PATENT DOCUMENTS

| | | | | |
|---|---|---|---|---|
| 7,840,891 B1* | 11/2010 | Yu | ......................... | G06F 40/197 715/223 |
| 9,256,783 B2* | 2/2016 | Huang | ............... | G06K 9/00463 |
| 9,639,900 B2* | 5/2017 | Huang | ............... | G06K 9/00463 |
| 9,916,626 B2* | 3/2018 | Huang | ................. | G06Q 40/123 |
| 10,580,089 B2* | 3/2020 | Mori | ................. | G06K 9/00288 |
| 10,614,526 B2* | 4/2020 | Mori | ..................... | H04W 12/06 |
| 10,621,678 B1* | 4/2020 | Ramotar | ............. | G06Q 40/123 |
| 10,878,516 B2* | 12/2020 | Huang | ................. | G06Q 40/123 |
| 2014/0244455 A1* | 8/2014 | Huang | ..................... | G06T 7/00 705/31 |
| 2014/0244456 A1* | 8/2014 | Huang | ................. | G06Q 40/123 705/31 |
| 2014/0297490 A1* | 10/2014 | Harnisch | ............. | G06Q 40/123 705/31 |
| 2016/0155202 A1* | 6/2016 | Huang | ................. | G06Q 40/123 382/176 |
| 2016/0328806 A1* | 11/2016 | Mori | ................... | G06K 9/00302 |
| 2021/0049708 A1* | 2/2021 | Huang | ................. | G06Q 40/123 |
| 2021/0209551 A1* | 7/2021 | Navarra | ................... | G06N 5/04 |

* cited by examiner

*Primary Examiner* — Anand P Bhatnagar
(74) *Attorney, Agent, or Firm* — Blake E. Vande Garde; Erickson Kernell IP, LLC

(57) ABSTRACT

A system and method which virtually eliminates the research work that entities required to file 1099 forms with the Internal Revenue Service (IRS) must do to ensure that the taxpayer identification number/legal business name, address combinations match those contained within the IRS database.

6 Claims, 9 Drawing Sheets

Exhibit 5. On-line Interactive TIN Matching results screen.

FIG. 4

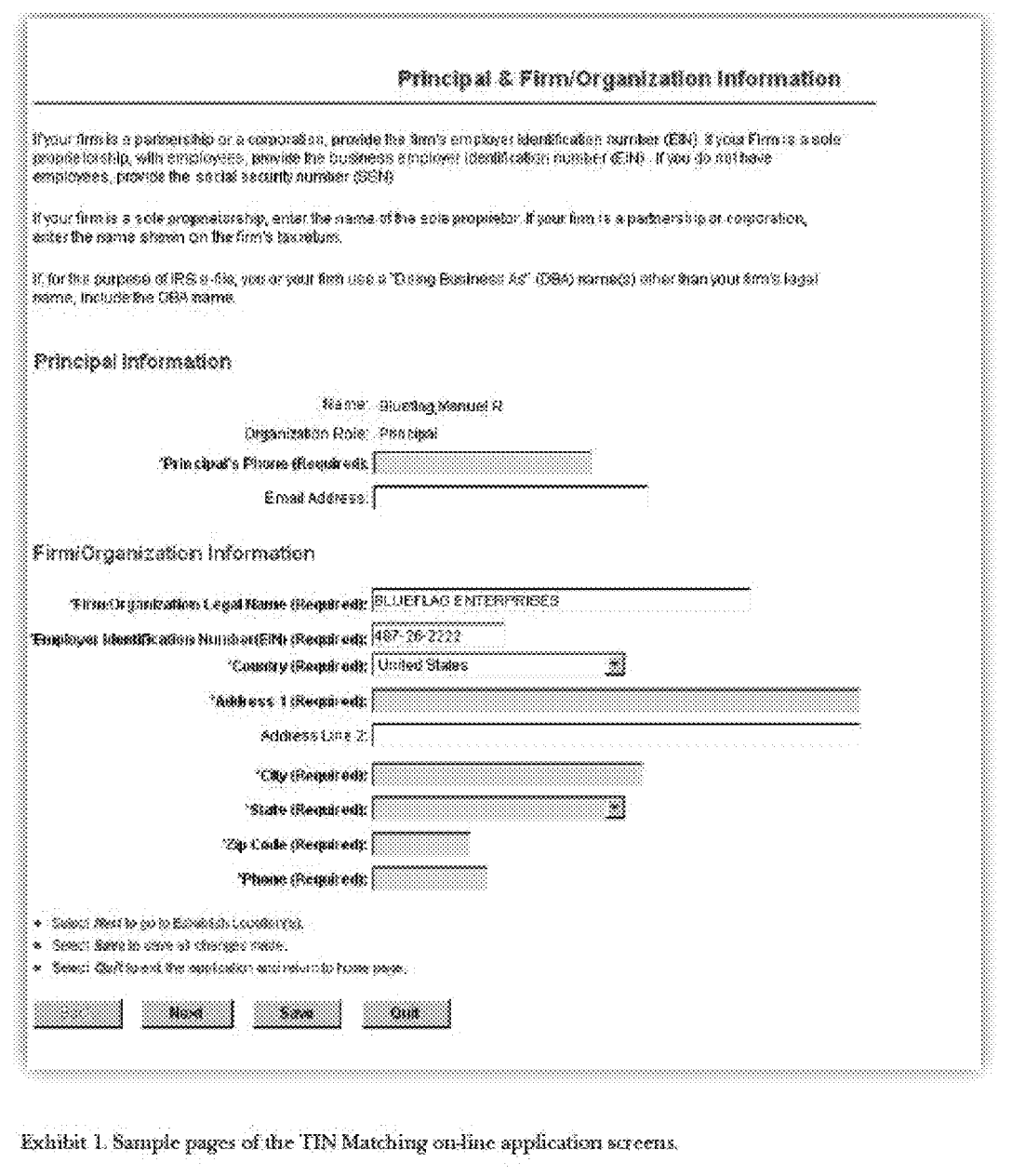

Exhibit 1. Sample pages of the TIN Matching on-line application screens.

FIG. 5

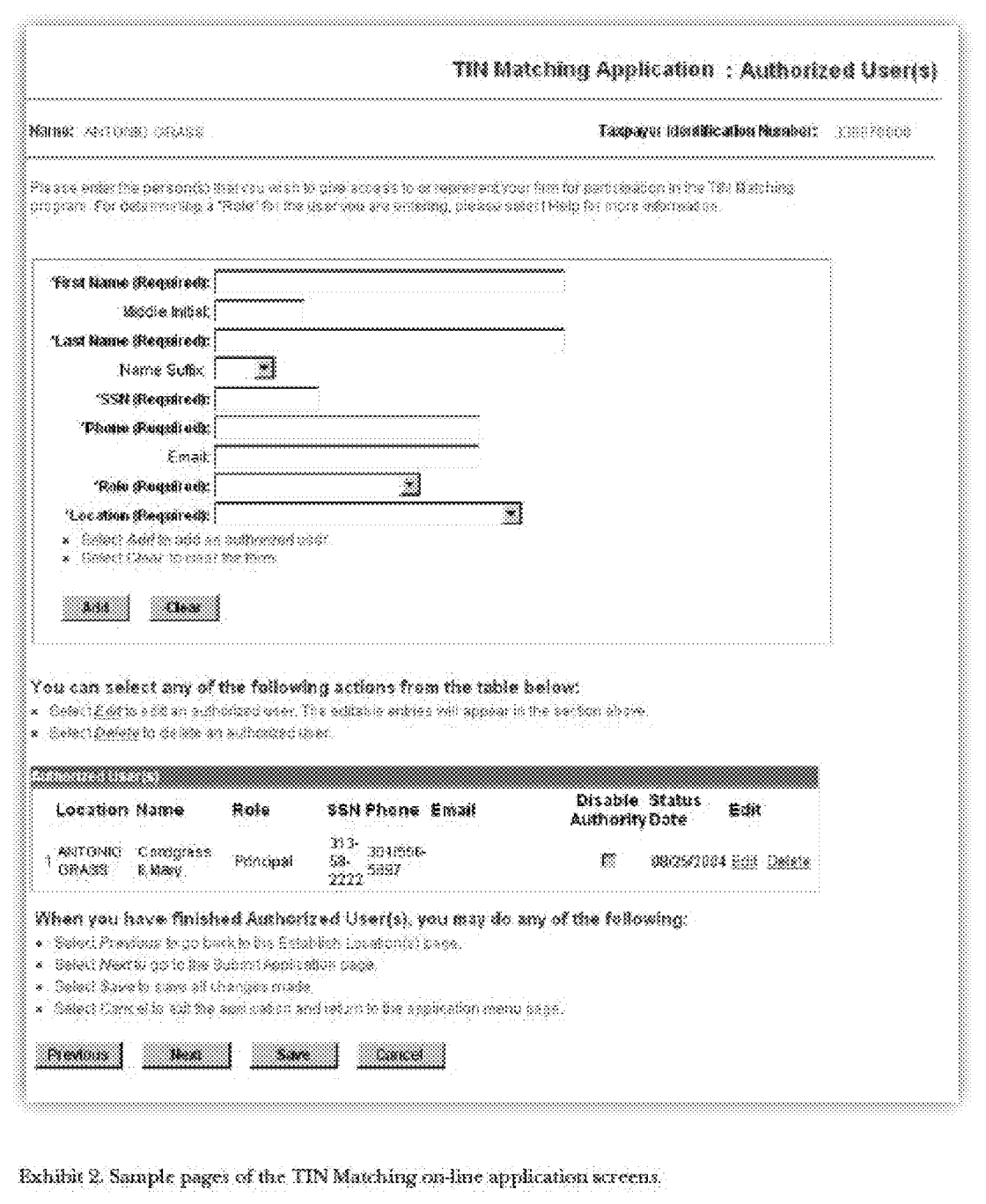

Exhibit 2. Sample pages of the TIN Matching on-line application screens.

FIG. 6

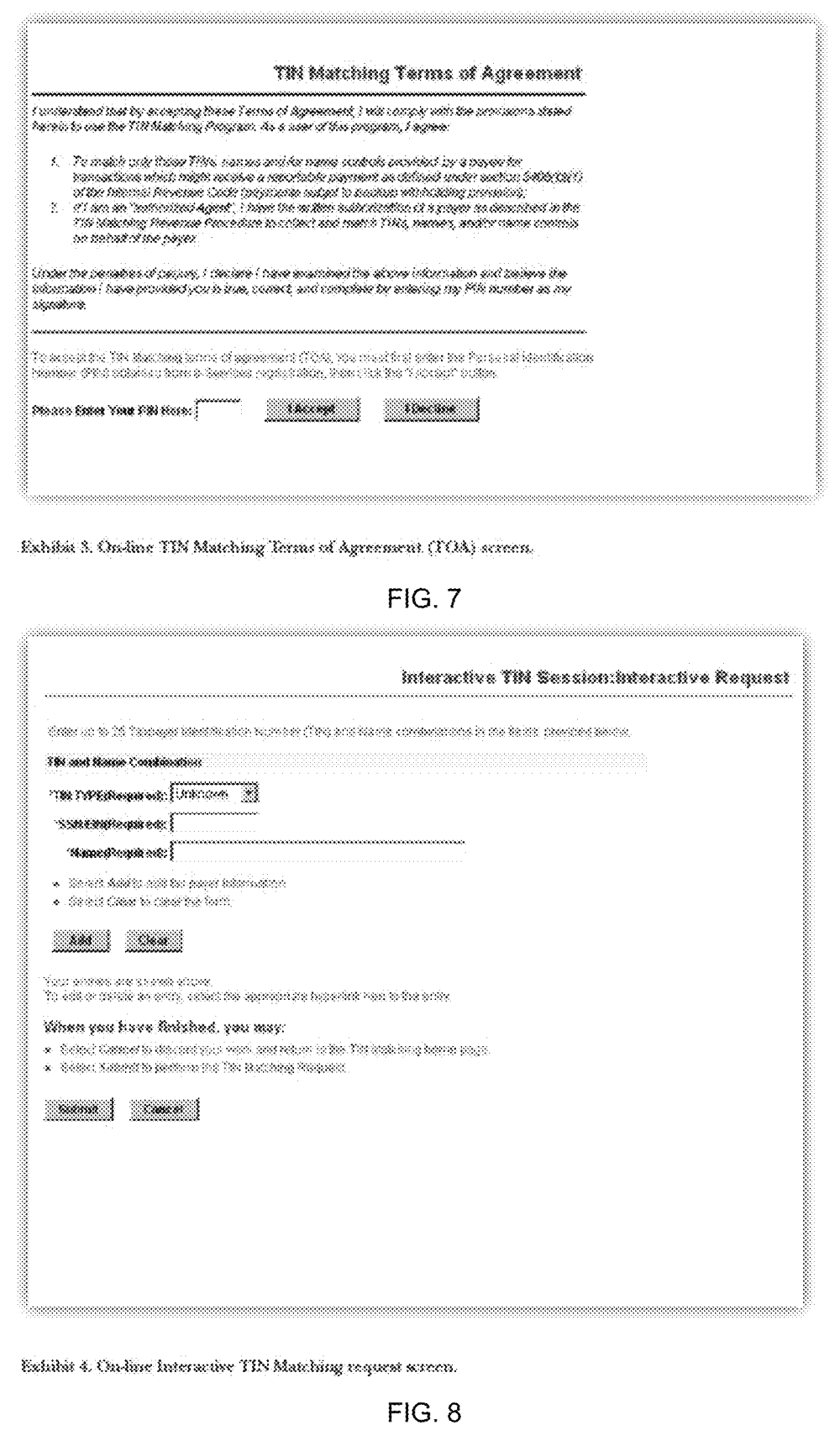

Exhibit 3. On-line TIN Matching Terms of Agreement (TOA) screen.

FIG. 7

Exhibit 4. On-line Interactive TIN Matching request screen.

FIG. 8

Exhibit 5. On-line Interactive TIN Matching results screen.

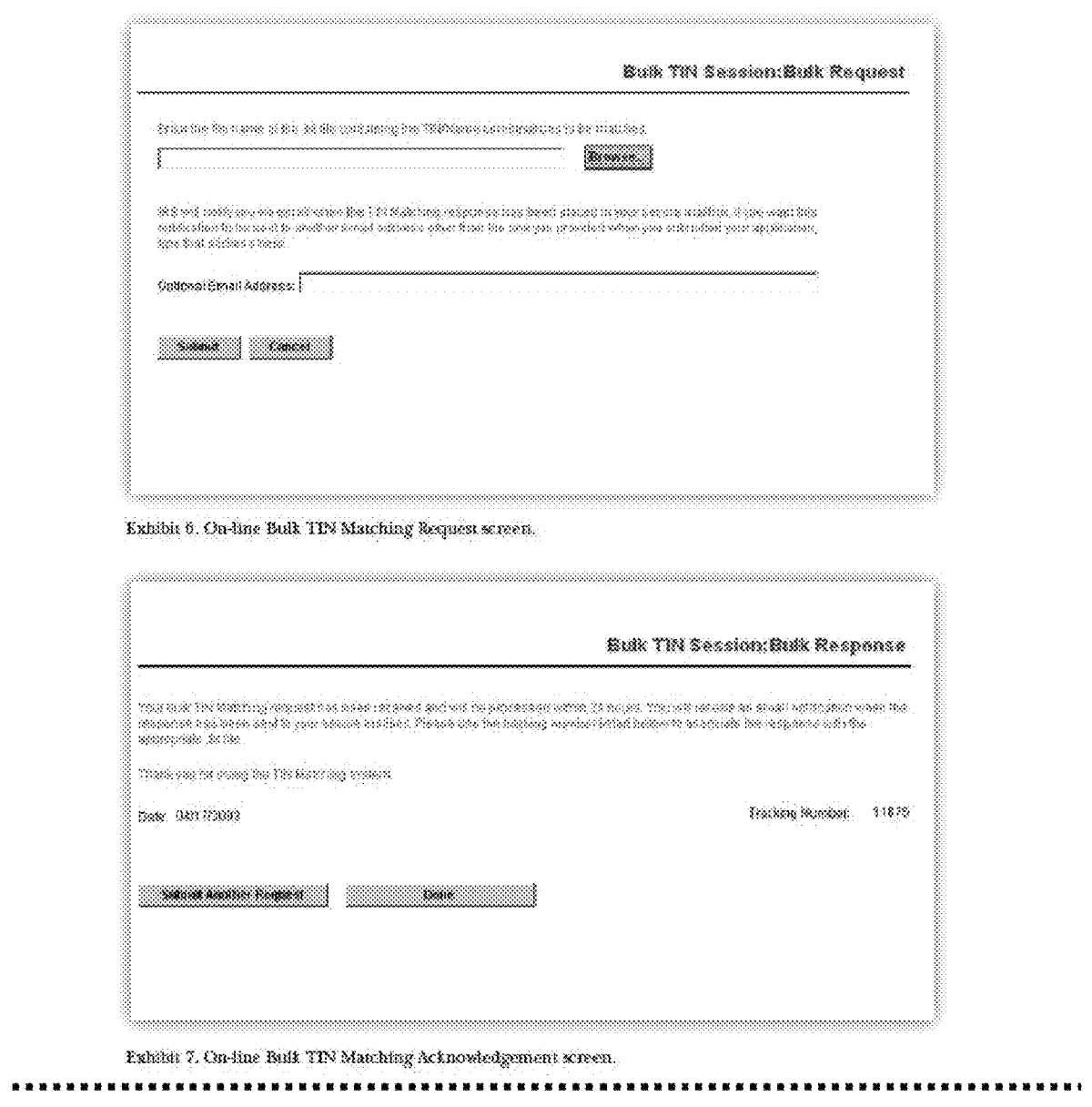

Exhibit 6. On-line Bulk TIN Matching Request screen.

Exhibit 7. On-line Bulk TIN Matching Acknowledgement screen.

FIG. 10

Example

SYSTEM AND METHOD FOR CORRECTING DOCUMENTS

RELATED CASES

This application claims the priority of the provisional application Ser. No. 62/798,242 filed Jan. 29, 2019. Applicant hereby incorporates by reference the entire content of provisional application Ser. No. 62/798,242.

FIELD OF INVENTION

The present invention related to devices and technology used for data processing and more specifically to devices and technology which categorized, consolidate and correct tax documents.

BACKGROUND OF THE INVENTION

In the united states, the internal revenue Service (IRS) requires each business to issue a Form 1099 to each non-employee or business paid at least $600 in services (including materials), prizes, awards, rent, medical and health care payments, attorney fees, or any other income payment each year. When a medical provider is paid $600 or more on an annual basis from a single Payor, that Payor must send a printed 1099 to the medical provider as well as file that payment with the IRS electronically. The IRS requires that the Taxpayer Identification Number (TIN) and the legal business name affiliated with that TIN match the information within the IRS database. The IRS also requires that the address associated with the TIN/legal business name be a valid and deliverable address. Per the guidelines from the IRS, it is the Payor's responsibility to verify and ensure that this information is confirmed and accurate. For each non-confirmed IRS TIN/legal business name, there is a potential fine of $100 for every record where the combination does not match the IRS database to the Payor. There is an additional $50 fine for the Providers that do not furnish the proper information to the Payor. Payors can potentially abate these fines by supplying "reasonable cause" data to show that an effort was made to capture the correct TIN/Legal name combination.

The process of verifying and confirming that the TIN/legal business name, address combination is both tedious and cumbersome. Most Payors will mail out a W9 (Request for Taxpayer Identification Number and Certificate) and manually enter the returned information into their own bill or claims payment provider database. At year end, all payments made to a single TIN are added up and if the amount is greater than or equal to $600, the Payor must transmit a 1099 file to the IRS. When the Payor manually enters the returned information on the W9, most Payors do not validate that the returned information matches the IRS TIN/Legal name combination.

Thus, there remains a current need for a system and method for verifying and confirming that the TIN/legal business name, address combination is accurate. There is also a need for rectification and correction in the event that the TIN/legal business name, address combination is found to be inaccurate.

SUMMARY

The instant invention is a system and method which virtually eliminates the research work that entities required to file 1099 forms with the Internal Revenue Service (IRS) must do to ensure that the taxpayer identification number/legal business name, address combinations match those contained within the IRS database.

DESCRIPTION OF THE DRAWINGS

For the purpose of illustrating the invention, there is shown in the drawings a form that is presently preferred; it being understood, however, that this invention is not limited to the precise arrangements and instrumentalities shown.

Figure 4:
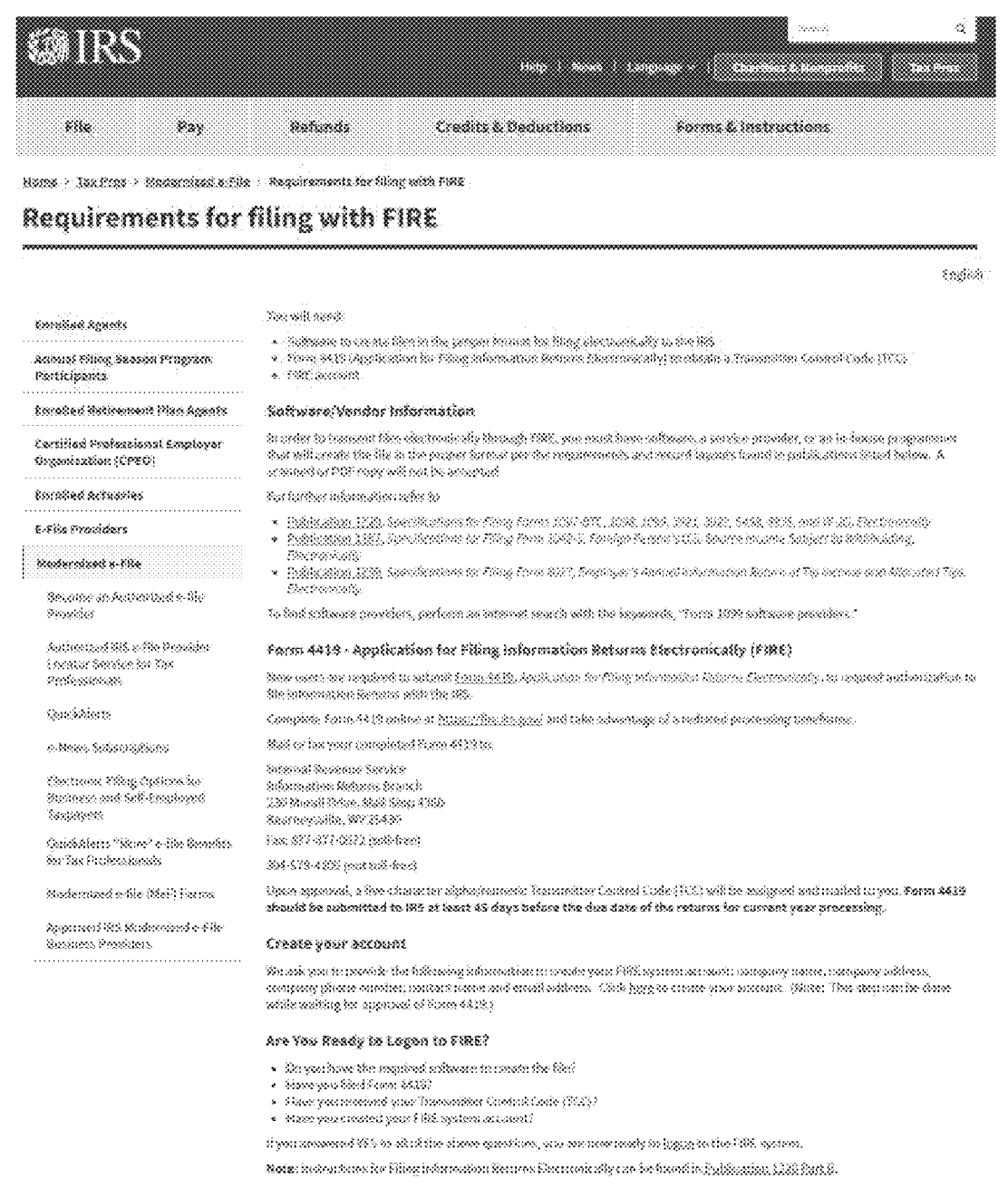

FIG. 4 is a website screenshot from the IRS.
FIG. 5 is a website screenshot from the IRS.
FIG. 6 is a website screenshot from the IRS.
FIG. 7 is a website screenshot from the IRS.
FIG. 8 is a website screenshot from the IRS.
FIG. 10 is a website screenshot from the IRS.

DETAILED DESCRIPTION

Figure 1:
FIG. 1 is a website screenshot from the IRS.
Figure 2:
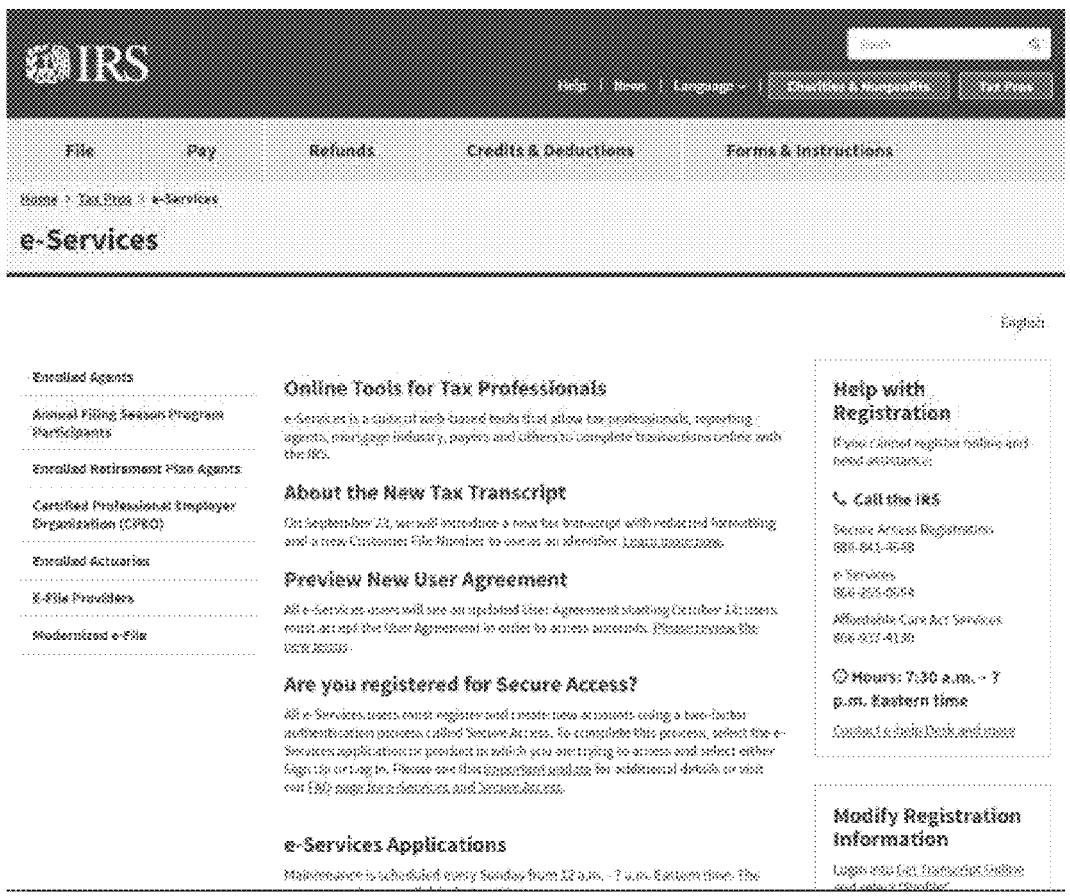
FIG. 2 is a website screenshot from the IRS.
Figure 3:
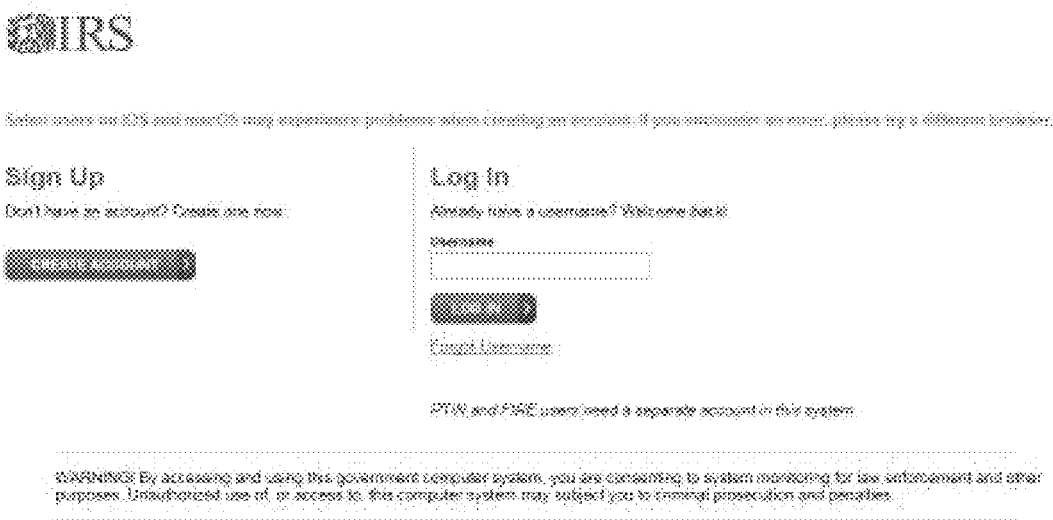
FIG. 3 is a website screenshot from the IRS.
Figure 9:
FIG. 9 is a website screenshot from the IRS.

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Form 1099 is one of several Internal Revenue Service (IRS) tax forms used in the United States to prepare and file an information return to report various types of income other than wages, salaries, and tips (for which Form W-2 is used instead). The term information return is used in contrast to the term tax return. Form 1099 is used to report payments to independent contractors, rental property income, income from interest and dividends, sales proceeds and other miscellaneous income. Specifically, form 1099-R is a tax form that payees use to report distributions from pensions, profit-sharing plans, annuities, IRAs, insurance contracts and other retirement plans. Form 1099-MISC is used to report non-wage compensation. There are currently twenty different 1099 forms in use.

For the purposes of this application, Payors will refer to those individuals and entities who paid another business entity, individual or independent contractor for services rendered in a single calendar year. Providers will refer to those individuals and entities who received payment from another business entity for services rendered in a single calendar year.

The IRS puts a mandate on the Payors to electronically transmit payment data to healthcare providers where the Payor has paid more than $600 to a single Taxpayer Identification Number (TIN) within a single calendar year. The IRS requires the Payor to seek out the correct legal name for each TIN along with the payment amount and a deliverable address. Most Payors will mail out a W9 (Request for Taxpayer Identification Number and Certification) and manually enter the returned information into a bill or claims payment provider database. They will also store an image of the W9 in case if the returned W9 information does not match the information within IRS database. At year end, all payments made to a single TIN are added up and if the amount is greater than or equal to $600, the Payor must transmit a 1099 file to the IRS. When the Payor manually enters the returned information on the W9, most Payors do not validate that the returned information matches the IRS TIN/legal name, address combination. The IRS will potentially fine the Payor $100 for each incorrect TIN/legal name, address combination.

The instant invention relieves a Payor of the responsibility of seeking out, validating and confirming the TIN/legal name, address combination for 1099 forms required by the IRS. One embodiment of the instant application focuses on Form 1099-R (pension and annuity plans) and 1099-MISC (Box 6—Medical and Healthcare Payments). The instant invention allows a Payor to outsource their 1099 mandates to an outside business herein referred to as the Validator.

The instant invention includes a computer implemented method for managing taxpayer identification number information, the computer implemented method comprising the steps of:

a. a Validator receives electronic information collected in conjunction with preparation of a 1099 submission packet from a business (Payor);
b. Validator catalogs all outbound W9 requests sent out by the Validator to Providers;
c. Validator catalogs all returned W9 requests from Providers with an imaging device to obtain an image of each returned W9 request;
d. Validator processes each image of each returned W9 request by:
　i. extracting a plurality of features from each image wherein optical character recognition is performed on at least one of the features;
　ii. comparing the extracted plurality of features and output text to a graphical database and a textural database, respectively, containing a plurality of verified 1099 information;
　iii. identifying matches to the extracted plurality of features and output text to a plurality of verified 1099 entries;
　iv. identifying non-matches to the extracted plurality of features and output text to the verified 1099 entries;
e. the Validator then generates a test file containing the verified 1099 entries;
f. Validator submits the test file electronically to the Internal Revenue Service (IRS) for confirmation of the verified 1099 entries wherein the IRS compares the verified 1099 entries with IRS 1099 entries stored within an IRS database;
g. Validator receives a reviewed test file from the IRS wherein the reviewed test file includes a listing of matching 1099 entries which match IRS 1099 entries stored within the IRS database and non-matching 1099 entries which do not match IRS 1099 entries stored within the IRS database;
h. Validator processes the reviewed test file from the IRS by extracting the matching 1099 entries and adding them to a confirmed 1099 database;
i. Validator generates a listing of all non-matching 1099 entries;
j. Validator compares the non-matching 1099 entries with the entries in the confirmed 1099 database;
k. Validator updates and corrects the non-matching 1099 entries which match entries in the confirmed 1099 database and adding those corrected entries to the matching 1099 entries;
l. Validator runs address validation routines on the matching 1099 entries to locate non-deliverable addresses and to ensure documents will go to a deliverable address;
m. Validator substitutes a deliverable address contained within the confirmed 1099 database using our proprietary provider database that stores know deliverable addresses for a given Tax ID for any matching non-deliverable address;
n. Validator generates an updated 1099 submission packet and return the updated 1099 submission packet to the business;
o. Validator mails out additional W9 requests to any remaining non-deliverable address, Incorrect Tax ID/Legal name combinations to a deliverable address for a given Tax ID;
p. Validator conducts web-searches by one or more persons on any remaining non-deliverable addresses to locate deliverable addresses;
q. Validator substitutes deliverable addresses located in the web-searches for non-deliverable addresses;
r. Validator updates the confirmed 1099 database with deliverable addresses located in the web-searches;
s. Validator updates the 1099 submission packet; and
t. Validator obtains and stores an image of all entries within the updated 1099 submission packet.

In one embodiment of the above method, the 1099 submission packet contains a taxpayer identification number/legal business name, address combinations for each business, organization or individual which has been paid by the business. In another embodiment of the above method, the 1099 submission packet contains a taxpayer identification number/legal business name, address combinations for each business, organization or individual required by 1099-MISC and/or 1099-R.

To summarize the above, Payors outsource their 1099 mandates to a Validator. The Validator tracks all outbound W9 requests sent to Providers, catalogs all returned W9s received from Providers, captures an image of the returned W9, performs one or more data capture of the TIN/legal name and address information, checks the returned data against the IRS TIN/legal name, address database, adds IRS confirmed TIN/legal name, address combinations into a proprietary 1099 database accessible only by the Validator, and provides a spreadsheet of all 1099 adjusted names.

The Payor, between January 1 and January 31, sends Validator the 1099 file that would normally go straight to the IRS. Validator, acting as an authorized agent, sends a Test file to the IRS. The IRS sends back, on a TIN by TIN line item, which entries match the IRS database and which records do not. For the records that match, Validator leaves the TIN/Legal name combination as is. For the mismatch records, Validator compares the TIN to their proprietary 1099 database and updates the Legal names to the confirmed IRS matches stored in our database. Validator also runs a series of address validation routines to ensure that when a 1099 is mailed to a Provider, the address is deliverable according to the USPS. When the address is deemed to be undeliverable, Validator substitutes a "known" address for the TIN with the undeliverable address from our address tables stored in their proprietary 1099 database. Validator updates the 1099 file with deliverable addresses as well as TIN/legal name, address combinations and then returns the updated 1099 file back to the Payor. The Payor then has either a) Validator print the 1099s, b) prints 1099s themselves or c) outsources 1099 printing to a third-party vendor. By using Validator, the TIN/Legal name, address combinations are typically over 98% correct and the addresses are also typically over 98% deliverable according to the USPS. For the less than 2% TIN/legal name, address errors, Validator mails out additional W9 requests to those Providers. For the less than 2% undeliverable addresses, Validator staff members do web searches to obtain a deliverable address and stores that data in the Validator's proprietary 1099 database. Every mailing of W9s, B-Notices, $2^{nd}$ B-Notices, and 1099s are tracked and an image of each envelope is retained at Validator. This will be used for "reasonable cause" data to prove that Validator and Payor followed the IRS guidelines for attempting to obtain correct information from healthcare providers.

As stated previously, when a medical provider is paid $600 or more on an annual basis from a single Payor, that payor must send a printed 1099 to the medical provider as well as file that payment with the IRS electronically. For each non-confirmed IRS TIN/legal name, address match, for 2018, there is a potential fine of $100 for every record where the TIN/legal name, address combination does not match the IRS database to the Payor. There is an additional $50 fine for the Providers that do not furnish the proper information to the Payer. Payers can potentially abate these fines by supplying "reasonable cause" data to show that an effort was made to capture the correct TIN/Legal name combination. "Reasonable Cause"

From an IRS website—states that if these measures are taken within the expressed time frame (15 days from receiving CP2100), as long as a Payor satisfy following the IRS rules by providing proof, a potential fine can be nullified. A Validator must follow these guidelines to the letter as well as adding in additional procedures and programs to surpass IRS mandates. For example, a Validator may take and maintain a picture of every mailing date stamped to show that a W9 form was sent to the Provider in question in order to obtain the correct information.

Reasonable Cause Regulations & Requirements for Missing and Incorrect Name/TINs

Refer to IRS Publication 1586

III. Reasonable Cause
To show that the failure to include a correct TIN was due to reasonable cause and not willful neglect, filers must establish that they acted in a responsible manner both before and after the failure occurred and that:
there were significant mitigating factors with respect to the failure (for example, an established history of filing information returns with correct TINs), or
   the failure was due to events beyond the filer's control (for example, actions of the payee or any other person).
Except as otherwise stated in this publication, acting in a responsible manner for missing and incorrect TINs generally includes making an initial solicitation (request) for the payee's name and TIN and, if required, annual solicitations. Upon
receipt of the newly provided TIN, it must be used on any future information returns filed. Refer to Treas. Reg. 301.6724—
1 for all reasonable cause guidelines.
IV. Notice 972CG, Notice of Proposed Civil Penalty
Proposed Penalty Notice
Notice 972CG proposes an IRC 6721(a) penalty for the information returns that were filed late, filed on incorrect media,
or filed with missing or incorrect TIN, or a combination of these failures. For information returns filed with missing or incorrect TIN, Notice 972CG includes a list of the information returns filed with missing or incorrect name/TIN combinations.
Filers should compare this list with their records to determine if:
   appropriate action was taken in the year for which the penalty is being proposed (see Part VI) to meet the requirements
for establishing reasonable cause, and
   an annual solicitation must be made in the current year to avoid penalties in future years.
Contents of Notice 972CG Include:
   An explanation of the proposed penalty,
   An explanation of how to respond to the notice,
   A record of each submission considered in the total penalty, including the form type, date received (if not timely filed), whether the returns were original or corrected, the transmitter control code (for electronic filers), and the type of penalty that applies (or penalties that apply),
   A list of the information returns filed with missing or incorrect name/TIN combinations,
   A summary of the proposed penalty, which takes into consideration all penalties proposed, and the maximum penalty amount that can be assessed under IRC 6721(a),
   A response page, and
   A payment/correspondence slip.
How to Answer Notice 972CG
   The notice has to be answered within 45 calendar days (60 days for foreign payers) from the notice date.

If more time is needed, submit a written request to the address listed on the notice before the end of the 45 day (60 days for foreign payers) period.

Send in the portion of the payment/correspondence slip that is appropriate to your response (i.e., fully agreeing, partially agreeing, or totally disagreeing with the proposed penalty). Sign in the space provided and submit payment if fully or partially agree to the proposed penalty.

In seeking a waiver of the proposed penalty, you must submit a written statement that:

States the specific provision under which the waiver is being requested (for example: event beyond filer's control), see § 301.6724-1(b) and (c), Sets forth all the facts alleged as the basis for reasonable cause and that the filer acted in a responsible manner (for example: specify if the applicable solicitation (initial, first annual, second annual, etc.) for each missing/incorrect TIN appropriately took place in the time and manner required by regulations, see part VI for more information on TIN solicitation rules, as well as § 301.6724-1(e) & (f)), Contains signature of person required to file the return, and)

Contains declaration that it is made under penalties of perjury.

Do not submit copies of the solicitations unless requested later on by the IRS.

If reasonable cause is established, IRS Letter 1948C will be issued stating that the explanation given was accepted and the applicable penalty will not be assessed.

If the reply does not establish reasonable cause, or only partially establishes reasonable cause, a penalty will be assessed. A balance due notice (CP15 or CP215) including appeal rights will be sent.

No response to the Notice 972CG within 45 days (60 days for foreign payers) will result in assessment of the full amount of the proposed penalty and a balance due notice (CP15 or CP215) being issued.

Quarterly Updates

1099-MISC are created for medical payments to health care providers (Provider). If a Provider is paid $600 or more on an annual basis from a single payer, the Payor must create a 1099 and send it to the Provider. The Payor must also transmit that this payment was made to this provider with a specific Tax ID, legal name and address. A Validator can request quarterly files from Payors. April 1, July 1, October 1 and December 1. These may be referred to as "mock" files. There are two main reasons for this.

First, Providers ask Payors to send Provider Tax ID, name and address information for any payment made within the calendar year. This can range from $0.01 and up. Though only payments of $600 or more are required to get a 1099, Validator can pro-actively reach out to Providers where the Validator does not have the correct Tax ID/legal name, address combination according to the IRS. The Validator sends out a W9 request that asks the Provider to fill in their Tax ID, Legal Name and address.

Second, cash flow. The 1099 filings must be printed by January 31st and filed by March 31st. If the Validator has a contract with a client for a $5,000 annual fee, the fee is broken up into 4 payments of $1,250. This allows the Validator to send and receiving W9 requests among many other processes on a daily basis.

Known Address Substitution

The IRS has not, to date, put any kind of mandate on assuring delivery of the 1099s to the Providers. In other words, if the address that a Payor has on file is "somewhere in the US", the IRS will accept this address as long as it is not a Null value. In the instant invention, the Validator has gone a step further by accessing "known addresses for the Tax Id in question" through a custom built "Virtual Provider Network". From this database, Validator will substitute only non-deliverable addresses (does not address validate according to USPS) to a known address where they have seen a deliverable address from one of their multiple data sources. Between January 1 and January 31 of every year, Payors send their 1099 file for Validator to update TIN/Legal name combinations as well as deliverable addresses prior to the Payor either a) printing 1099s by themselves, b) sending 1099 to third party vendor for print or c) contracting with Validator to print the 1099s. On average, 3% of every 1099 file received will contain undeliverable addresses. Validator's Virtual Network will correct approx. 70% of these undeliverable addresses bringing the 3% down to 1%.

Figure 11:
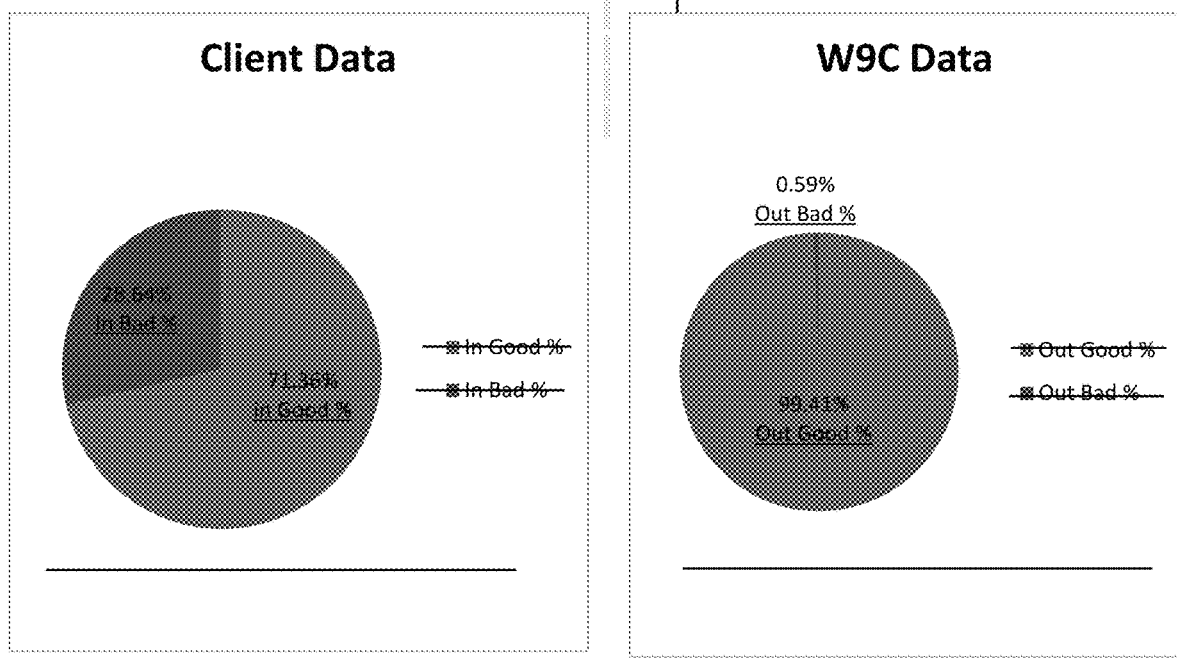
FIG. 11 is an example of the data generated by the Validator.

Typically, Validator will request for a Payor to send the previous year's 1099 file. This helps to, a) to make sure it is in an approved IRS format, b) to assess the amount of TIN/legal names, addresses that are correct and that are in error, c) to assess how many records Validator can correct as of this moment accessing their own proprietary 1099 database, d) how many addresses are undeliverable and how many Validator can correct as of this moment accessing their own proprietary 1099 database, d) how many addresses are undeliverable and how many Validator can correct. Validator can then produce a report that looks like the one shown below in FIG. 11.

In the above example, 1194 records were sent to Validator. The Validator then sends this data to the IRS as an authorized agent, to see how many TIN/Legal name combinations are correct. Validator also runs multiple address validation routines within its own computer database to see if the address supplied is a deliverable address. Of the 1194 records, 852 records are deemed as good by the IRS. The remaining 342 records do not have the TIN/Legal name combination according to the IRS. After running this data through the Validator's proprietary 1099 database, it was determined that the Validator can fix 335 of the 342 TIN/Legal name errors. Validator also determined that 88 addresses were undeliverable. Of the 88 addresses, the Validator substituted 82 known, deliverable addresses for those TIN's in question. This leaves only 7 W9 requests for the Validator to mail out to Providers to get the Payor's file to 100% accuracy.

IRS Data Validation

The Validator can file for and receive a TCC number. This TCC number allows a Validator to access the IRS for Bulk TIN validation. This Bulk TIN feature allows the Validator to send data to this site and see if the TIN/Legal name combination is correct. The data is transferred electronically the following format:

Here is a sample file being sent to the IRS
Taxpayer Identification Number (TIN) Matching
FILE SENT TO GOV:
3;999999999;DONALD DUCK;29730
3;123456789;MICKY MOUSE;29730
3;987654321;MINNIE MOUSE;29730
3;999999998;DR PLUTO;29730
3;999999997;DR GOOFY PLLC;29730
3;999999996;DISNEY INC;29730

The return file comes back to the Validator telling them which records are valid, according to the IRS, and which are incorrect (Please note, if IRS says a TIN/Legal name combination is incorrect, they do not tell you what the correct information is. The Validator must do the corrections). When the IRS says a TIN/Legal name combination is correct, the Validator adds that record into their proprietary 1099 database.

Here is a sample of the returned file from the IRS
FILE FROM GOV:
3; 999999999; DONALD DUCK;29730;6
3;123456789;MICKY MOUSE;29730;8
3;987654321;MINNIE MOUSE;29730;7
3;999999998;DR PLUTO;29730;3
3;999999997;DR GOOFY PLLC;29730;2
3;999999996;DISNEY INC;29730;6

This is the legend that explains what the highlight (underlined) return codes mean to the IRS. Look to FIG. 1 for the explanation from the IRS as to the number meanings.

Authorized Agent

Once a Payor signs up with Validator, the Validator instructs them on how to either a) obtain a TCC number and add the Validator on as an "Authorized agent" using form 4419 or b) add the Validator on as an authorized agent to their already existing account. When this is done, the Validator can transmit data to the Bulk TIN URL to see if the Payor has the correct TIN/Legal name combination. This also allows the Validator to send test 1099 files on behalf of the Payor as well as the production 1099 file at year end. FIGS. 2 through 10 contain screen shots from the IRS website detailing how to register and obtain authorization for agents to submit the required documentation.

Validator's Proprietary 1099 Database

Validator's 1099 database is comprised of hundreds of sources of health care provider (Providers) information. Validator has been gathering 1099 data since its inception and has amassed over 2 million confirmed TIN/legal name combinations. Validator also stores an "alternate good" table. Since subtle changes to names are also accepted by the IRS, it is appropriate to store these records in case a Payor sends a match to the "alternate good" table. As an example:

Record 1 TIN 123456789—Legal Name—Smith, John.
Record 2—TIN 123456789—Legal name—John Smith.

The IRS accepts both of these records as good, allowing the record to be filed as is instead of possibly changing to John Smith. All new Payor 1099 data is compared against the "confirmed good" table from Validator's 1099 database first. The second pass is to run the same Payor data against Validator's "alternate good" table store in the same database. This will reveal how many records can updated in real-time and how many records will require to sending out W9 requests. In one embodiment, Validator is 50%, 60%, 70%, 80%, 90%, 95%, 96%, 97%, 98%, 99% or better after comparing to the proprietary 1099 database.

Payor Savings

The instant invention eliminates the need for the amount of staff designated on collecting W9 information throughout the year. These payors spend a great deal of money on salaries to ensure that at year end, their 1099 file will be very clean. The instant invention allows a Payor to repurpose these employees into other duties.

Any method described herein may incorporate any design element contained within this application and any other document/application incorporated by reference herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The present invention may be embodied in other forms without departing from the spirit and the essential attributes thereof, and, accordingly, reference should be made to the appended claims, rather than to the foregoing specification, as indicating the scope of the invention. The invention illustratively disclosed herein suitably may be practiced in the absence of any element which is not specifically disclosed herein.

The invention claimed is:

1. A computer implemented method for managing taxpayer identification number information, the computer implemented method comprising the steps of:
    receiving electronic information collected in conjunction with preparation of a 1099 submission packet from a business;
    cataloging all outbound W 9 requests sent out by the business;
    cataloging all returned W 9 requests with an imaging device to obtain an image of each returned W 9 request;
    processing each image of each returned W 9 request by:
        extracting a plurality of features from each image wherein optical character recognition is performed on at least one of the features;
        comparing the extracted plurality of features and output text to a graphical database and a textural database, respectively, containing a plurality of verified 1099 information;
        identifying matches to the extracted plurality of features and output text to a plurality of verified 1099 entries;
        identifying non-matches to the extracted plurality of features and output text to the verified 1099 entries;
    generating a test file containing the verified 1099 entries;
    submitting the test file electronically to the Internal Revenue Service (IRS) for confirmation of the verified 1099 entries wherein the IRS compares the verified 1099 entries with IRS 1099 entries stored within an IRS database;
    receiving a reviewed test file from the IRS wherein the reviewed test file includes a listing of matching 1099 entries which match IRS 1099 entries stored within the IRS database and non-matching 1099 entries which do not match IRS 1099 entries stored within the IRS database;
    processing the reviewed test file from the IRS by extracting the matching 1099 entries and adding them to a confirmed 1099 database;
    generating a listing of all non-matching 1099 entries;
    comparing the non-matching 1099 entries with the entries in the confirmed 1099 database;
    updating and correcting the non-matching 1099 entries which match entries in the confirmed 1099 database and adding those corrected entries to the matching 1099 entries;
    running address validation routines on the matching 1099 entries to locate non-deliverable addresses and to ensure documents will go to a deliverable address;
    substituting a deliverable address contained within the confirmed 1099 database for any matching non-deliverable address;
    generating an updated 1099 submission packet and return the updated 1099 submission packet to the business;

mailing out additional W 9 requests to any remaining non-deliverable address;

conducting web-searches by one or more persons on any remaining non-deliverable addresses to locate deliverable addresses;

substituting deliverable addresses located in the web-searches for non-deliverable addresses;

updating the confirmed 1099 database with deliverable addresses located in the web-searches;

updating the 1099 submission packet; and obtaining and storing an image of all entries within the updated 1099 submission packet.

2. The method of claim 1 wherein the 1099 submission packet contains a taxpayer identification number/legal business name, address combinations for each business, organization or individual which has been paid by the business.

3. The method of claim 1 wherein the 1099 submission packet contains a taxpayer identification number/legal business name, address combinations for each business, organization or individual required by 1099-MISC and/or 1099-R.

4. A system for managing taxpayer identification number information comprising:

a computing device configured to receive a computer-readable file containing information collected in conjunction with preparation of a 1099 submission packet from a business;

a computer-readable file containing a list of all outbound W 9 requests sent out by the business;

a plurality of returned W 9 requests wherein the computing device is configured to receive an image of each returned W 9 request obtained from an imaging device and process each image of each returned W 9 request by:

extracting a plurality of features from each image wherein optical character recognition is performed on at least one of the features;

comparing the extracted plurality of features and output text to a graphical database and a textural database, respectively, containing a plurality of verified 1099 information;

identifying matches to the extracted plurality of features and output text to a plurality of verified 1099 entries;

identifying non-matches to the extracted plurality of features and output text to the verified 1099 entries;

a computer-readable test file generated by the computing device which contains the verified 1099 entries;

wherein the computer-readable test file is submitted electronically to the Internal Revenue Service (IRS) for confirmation of the verified 1099 entries wherein the IRS compares the verified 1099 entries with IRS 1099 entries stored within an IRS database;

a computer-readable reviewed test file is received from the IRS wherein the reviewed test file includes a listing of matching 1099 entries which match IRS 1099 entries stored within the IRS database and non-matching 1099 entries which do not match IRS 1099 entries stored within the IRS database;

wherein the computer-readable reviewed test file from the IRS is processed by extracting the matching 1099 entries and adding them to a confirmed 1099 database;

wherein a listing of all non-matching 1099 entries is generated;

wherein the non-matching 1099 entries are compared with the entries in the confirmed 1099 database;

wherein the non-matching 1099 entries which match entries in the confirmed 1099 database are corrected and those corrected entries are added to the matching 1099 entries;

wherein the computing device runs address validation routines on the matching 1099 entries to locate non-deliverable addresses and to ensure documents will go to a deliverable address;

wherein the computing device substitutes a deliverable address contained within the confirmed 1099 database for any matching non-deliverable address;

an updated 1099 submission packet generated by the computing device and returned to the business;

wherein additional W 9 requests are mailed to any remaining non-deliverable address;

wherein web-searches are conducted by one or more persons on any remaining non-deliverable addresses to locate deliverable addresses and substitute deliverable addresses located in the web-searches for non-deliverable addresses;

wherein the confirmed 1099 database is updated with deliverable addresses located in the web-searches;

wherein the 1099 submission packet is updated; and an image of all entries within the updated 1099 submission packet obtained by an imagine device and stored in a database.

5. The system of claim 4 wherein the 1099 submission packet contains a taxpayer identification number/legal business name, address combinations for each business, organization or individual which has been paid by the business.

6. The system of claim 4 wherein the 1099 submission packet contains a taxpayer identification number/legal business name, address combinations for each business, organization or individual required by 1099-MISC and/or 1099-R.

* * * * *